United States Patent [19]

Kawahara

[11] 3,910,424

[45] Oct. 7, 1975

[54] METHOD AND APPARATUS FOR ARRANGING OBJECTS

[75] Inventor: Kansi Kawahara, Osaka, Japan

[73] Assignees: Mitsui Mining & Smelting Co., Ltd., Tokyo; Kawahara Seisakusho Co., Ltd., Osaka, both of Japan

[22] Filed: Feb. 15, 1974

[21] Appl. No.: 442,899

[52] U.S. Cl. ........ 214/6 DK; 198/134; 198/177 R; 198/185; 271/204; 214/152
[51] Int. Cl.² ........................................ B65G 57/14
[58] Field of Search ........ 214/5.5, 6 R, 6 DK, 6 M, 214/8, 152; 198/134, 177 R, 178, 180, 185; 271/185, 189, 192, 204, 206

[56] References Cited
UNITED STATES PATENTS

| | | | |
|---|---|---|---|
| 1,510,869 | 10/1924 | Skinner | 214/5.5 |
| 1,540,687 | 6/1925 | Feistel et al. | 271/204 X |
| 2,944,655 | 7/1960 | Griswold | 198/177 R X |
| 3,240,356 | 3/1966 | Hill | 214/8 X |
| 3,319,355 | 5/1967 | Lagnese | 271/204 X |
| 3,580,387 | 5/1971 | King | 198/178 |

*Primary Examiner*—Robert J. Spar
*Assistant Examiner*—Leslie J. Paperner
*Attorney, Agent, or Firm*—Woodhams, Blanchard and Flynn

[57] ABSTRACT

A method of arranging objects comprising moving the objects initially in a vertical posture suspended from moving beams, and, during their movement, lifting their bottom portions up so as to make them assume an inclined posture, and finally, extracting the beams from them thereby allowing them to fall down in a horizontal posture one above another to form a stack.

8 Claims, 3 Drawing Figures

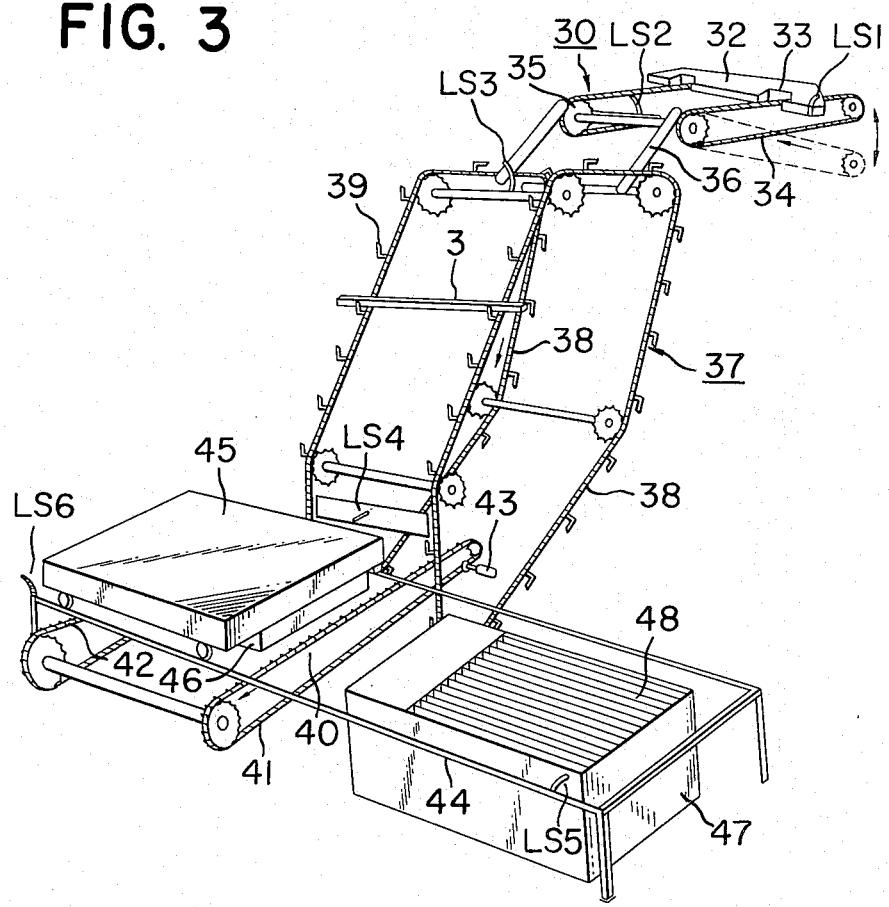

3,910,424

METHOD AND APPARATUS FOR ARRANGING OBJECTS

BACKGROUND OF THE INVENTION

The present invention relates to a method and apparatus for stacking objects in an orderly condition.

Generally, because comparatively soft and pliable objects such as electrodes made of copper or lead (mainly cathode plates) used in the electrolysis of metallic salts, are poor in stiffness, and their stacking and arranging by mechanical means has been extremely difficult, up to now, they have almost exclusively been handled manually, which is not only a great inconvenience but also is of very low efficiency.

Accordingly, an object of the present invention is to provide a method and apparatus capable of handling those objects which are poor in stiffness, automatically and efficiently throughout, without requiring any manual operation.

Another object of the present invention is to provide a method and apparatus capable of automatically and efficiently arranging objects by first moving these objects horizontally in a suspended vertical position in which they are suspended by their top edges from beams at uniform intervals by mounting these beams on a horizontally installed conveyor, then during this conveying movement of the objects, lifting up the lower end portions of these objects successively by means of an inclined guide plate installed below the conveyor, forcing the objects into an inclined posture, and thereafter, removing the beams from the objects by means of a beam extracting apparatus installed above the object stacking station, and letting these objects fall down in a horizontal posture so as to be stacked one above another, without requiring thereby any manual operation throughtout the process.

The present invention will be explained more particularly with reference to the accompanying drawings wherein:

BRIEF DESCRIPTION OF THE DRAWINGS

FIG. 3 is an oblique view of the beam transporting apparatus attached to the apparatus shown in FIG. 2.

DETAILED DESCRIPTION OF THE INVENTION

Figure 1:
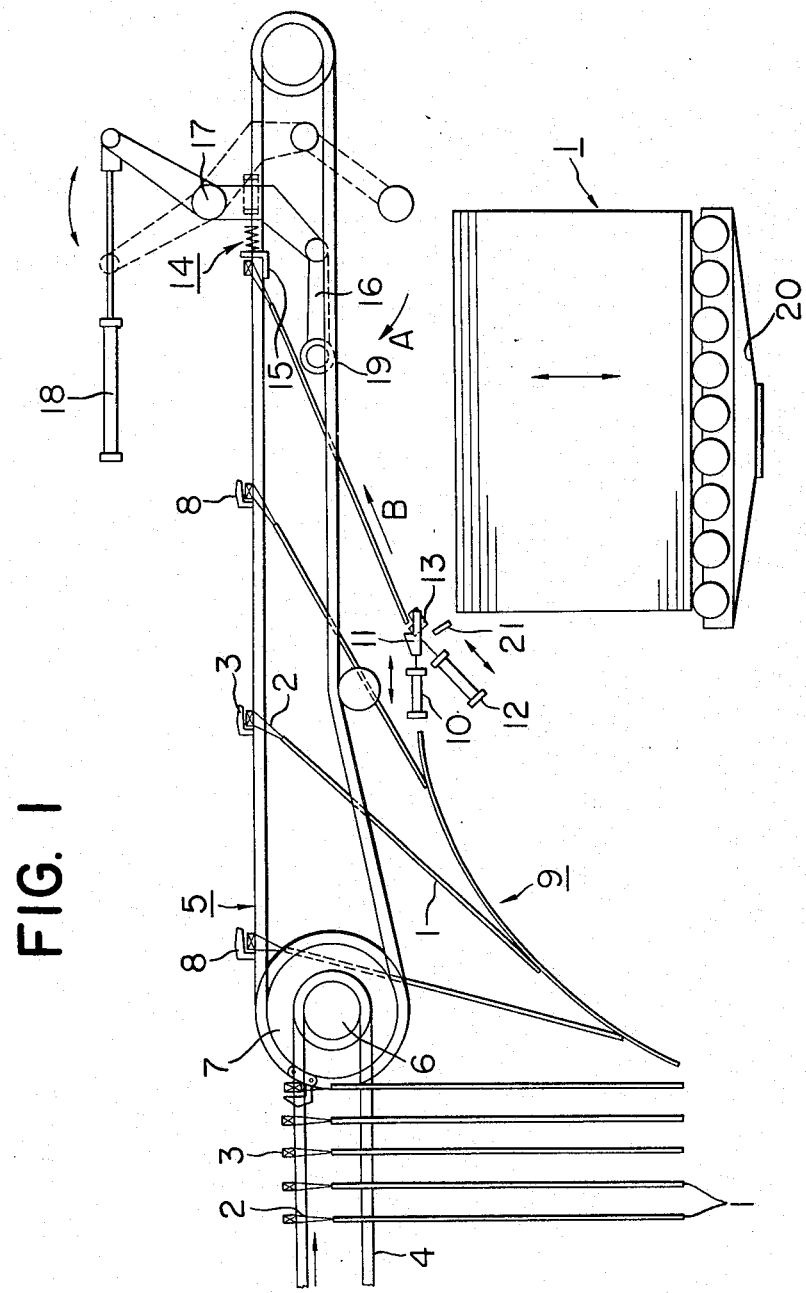
FIG. 1 is a front view of an apparatus embodying the present invention.

In FIG. 1, there are shown electrodes 1, having at proper positions in their top edge area a plurality of circular ribbons 2 serving to stably suspend the electrodes 1. Said ribbons 2 may be formed of some suitable metallic material and normally several of them are affixed to the top edge of said electrodes 1. Beams 3, freely insertable into and extractable from said ribbons 2 are formed as bars having rectangular cross sections, with their length somewhat longer than the width of the electrodes 1. However, the cross section of the beam 3 is not limited to a rectangular form, because a simple round bar may just as well serve the purpose.

A conveyor 4 comprises two endless belts installed in parallel with the space therebetween being slightly wider than the width of the electrodes.

A conveyor 5 is installed with its feed position in communication with the discharge portion of said conveyor 4 in such a way that the driving wheel 6 of said conveyor 4 and the driving wheel 7 of said conveyor 5 are driven by one and the same driving shaft, thereby said conveyor 5 is driven faster than said conveyor 4. On the periphery of said conveyor 5, there are attached a plurality of hooks 8 for receiving beams 3 at intervals wider than the intervals of the electrodes 1 on the conveyor 4.

A guide plate 9 for the electrodes 1 is disposed underneath the conveyor 5 with its smooth curved surface gradually rising along the moving direction of said conveyor 5.

Hydraulic power cylinders 10 and 12 are disposed in parallel on the extension line of the guide plate 9 and are respectively provided with seats 11 and 13 at their ends, the cylinder 10 supporting its seat 11 in a nearly horizontal or slightly upwardly directed posture, while the cylinder 12 supports its seat 13 in a more upwardly directed posture than said seat 11. Although in the embodiment shown, two cylinders 10 and 12 are used, by an appropriate design, only one cylinder may be provided to serve the purpose just as well.

A stopping device 14 is disposed between the two belts of the conveyor 5 in a position to be engaged by the beams 3 and the stopping device is provided with a sensor that serves to stop the motion of the conveyor 5 when one beam 3 comes in contact with the contact member 15 of said stopping device 14.

A supporting arm 16 which serves to support the electrodes 1 from their bottom side when they are brought into an inclined position, is swivellably mounted on a shaft 17. The arm 16 is provided with a supporting roller 19 at its end, and is actuated by a power cylinder 18. Said power cylinder 18 is so controlled that it is actuated when it receives a command from said sensor on the stopping device 14.

A beam extracting apparatus 22 disposed alongside the path travelled the beams 3. The beam extracting apparatus 22 comprises an upper supporting member 27 and a lower supporting member 28 driven respectively by a power cylinder 25 and a power cylinder 26, said upper and lower supporting members being equipped respectively with four extracting rollers 24 having an appropriate driving mechanism, and four extracting rollers 23 adapted to be driven by said rollers 24, whereby these two sets of rollers are adapted to apply mild pressure between them. In this regard, it should be understood that said extracting apparatus 22 is not limited to a pinch roller mode as described above, but any mechanisms such as in extraction system utilizing magnetic attraction, a cylinder mechanism, and a simple long bar pushing mechanism, may be used at will.

A power cylinder 29 is located on the opposite side of said transport conveyor 5 from said beam extracting apparatus 22, corresponding exactly to the stopping position of a beam stopped by said stopping device 14, and is designed to push out a beam into the space between the roller sets 23 and 24 in the extracting apparatus 22 when a beam 3 is stopped by said stopping device 14.

Aligned with the beam discharge end of said beam extracting apparatus 22, there is disposed a trough-shaped receiving member 32, having apertures 33 spaced-apart at an appropriate distance, and a limit switch LS1 at the end thereof.

Underneath said receiving member 32, there is disposed in an intersecting relationship therewith a conveyor 30 having a limit switch LS2 disposed in its conveying path and comprising a pair of chains 34 that moves past the apertures 33 and that is designed to be swung up and down around a driving sprocket 35 by means of a power cylinder 31 attached to the opposite end of said conveyor 30.

At the discharge end of said conveyor 30, there are provided two inclined guides 36 having a limit switch LS3 disposed in the moving path of the objects, and below these two guides 36, there is installed a conveyor 37.

Said conveyor 37 comprises a pair of chains 38 that span a group of sprockets in such a way that they are disposed generally vertically, but they have short horizontal upper portions. The conveyor 37 is intermittently driven and is provided with a limit switch LS4 disposed to be activated by the beams it is conveying. The two chains are provided with a plurality of correspondingly located hooks attached on the periphery thereof.

Underneath said conveyor 37, there is installed a horizontally disposed conveyor 40 extending in an intersecting relationship with said conveyor 37, said conveyor 40 comprising a pair of chains 41 that span a pair of sprockets and that are provided with a plurality of correspondingly located uniformly spaced hooks 42 on their periphery. Located at the outside of the conveyor 40 where said two conveyors 37 and 40 intersect and where beams 3 are transferred, there is provided a pusher 43.

Above the conveyor 40 towards the moving direction thereof from the intersection between said conveyor 40 and said conveyor 37, there are disposed a pair of rails 44, on which a self-driving hanging truck 45 is mounted. Underneath the truck 45 there is a magnet 46, which can be lifted and lowered by a truck mounted power cylinder, not shown. On one end of the rails 44, a limit switch LS5 is installed and on the other end, a limit switch LS6 is installed, both serving to control said truck 45.

A container 47 for beams 3 is disposed underneath the rails 44 at one end of the travel of the truck 45, said container 47 being divided into divisions having widths equal to the intervals of the hooks 42 on the conveyor 40, by means of partitions 48.

Now, the mode of operation of the apparatus is described in detail. It should be understood in this connection that because, as will be seen from the following descriptions, all the detection and commanding means are conventional electric instruments, their relay circuit diagrams are not shown.

The object pieces to be handled by the apparatus made according to the present invention, in the described embodiment, that is electrodes 1, are brought to the conveyor 4 after being recovered from an electrolysis tank, not shown, and are suspended therefrom at uniform intervals by means of beams 3, thereby each electrode 1 is moved forwardly intermittently through a distance corresponding to the space between two succeeding electrodes, at a time. When an electrode 1 arrives at the junction between said two conveyors 4 and 5, after being moved in the manner just described, said electrode, suspended from said conveyor 4 which is momentarily stationary, is brought into engagement with a set of hooks 8 on the conveyor 5. Then, the next time said two conveyors 4 and 5 are moved, said electrode 1 is transferred onto said conveyor 5. During this transfer of said electrode 1, a beam mounted on the conveyor 4 with the longer sides of its rectangular cross section disposed vertically, is forcedly turned through approx. 90° so as to be mounted on the conveyor 5 with said longer sides of the rectangular section making contact therewith, thereby the ribbons 2 are somewhat spread apart to facilitate the extraction of the beam.

As soon as an electrode 1 is transferred onto the conveyor 5, its lower end portion comes into contact with the guide plate 9, thereby the lifting motion of the electrode 1 starts from this lower end portion. As the conveyor 5 moves forward, the lower end portion of an electrode 1 is gradually lifted up by the guide plate 9 so that the electrode 1 is finally brought to a suspended and rearwardly inclined position. The extent of inclination of the electrode 1 here shall preferably be made adjustable so as to make it possible to suit it to the degree of its stiffness. When the electrode 1 moves further, its beam 3 comes into contact with the contact member 15 of the stopping device 14 disposed within the direction of travel of the beam 3, to stop the conveyor 5, while by this time, because the bottom edge of the electrode 1 has moved past the guide plate 9, and has been brought into contact with the seats 11 and 13 of the power cylinders 10 and 12, the electrode is brought into a linearly inclined position, and simultaneously, because the power cylinder 18 is actuated by a command, the supporting arm 16 is turned around its shaft 17 in the direction of the arrow A in FIG. 1, with the result that its supporting roller 19 is brought into contact with the lower side of the inclined electrode 1 to support it in the position shown in solid lines in FIG. 1.

When the completion of this supporting motion of said supporting roller 19 is detected, the power cylinders 10 and 12 are actuated to lift the electrode 1 in the direction of its beam 3 along the arrow B, approx. 5 cm, with the result that the contact pressure between the beam 3 and the ribbons 2 is relieved to facilitate the beam extraction that follows. During this motion, the stopping device 14 exerts a properly adjusted contact pressure to the beam 3 to prevent its rising tendency.

Figure 2:
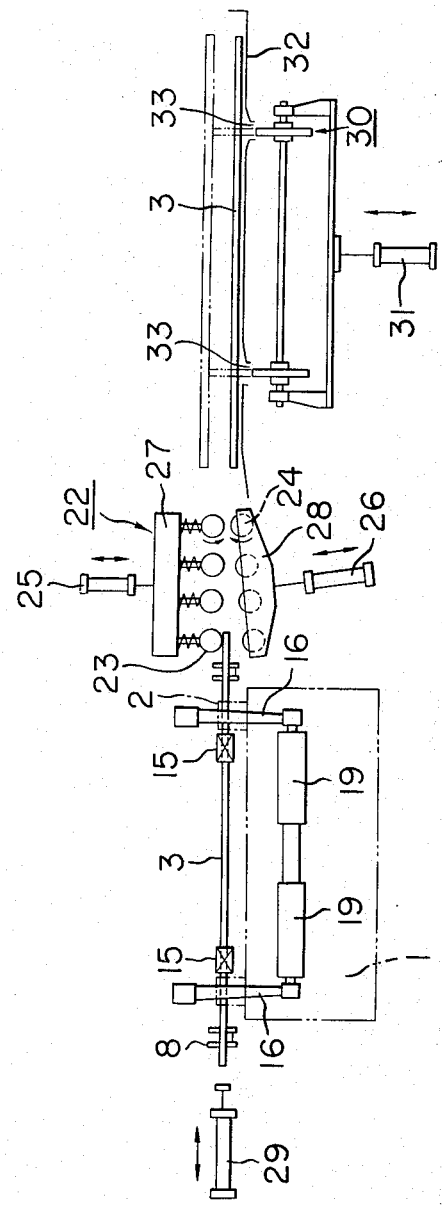
FIG. 2 is a side view of the beam extracting apparatus attached to the apparatus shown in FIG. 1.

Now that the preparatory operations are all over, the beam extracting apparatus 22 starts its operation. First, the power cylinder 29, which is disposed in abutment with one end of the beam 3 belonging to the resting electrode, is actuated by a command to push out the beam 3 from its one end toward the opposite end. Being guided by the hooks 8 and the contact member 15 of the stopping device 14, the beam 3 is pushed through the ribbons 2, projects from the other side, and its end thrusts into the pinching region between the extracting rollers 23 and 24. Simultaneously with this, the power cylinders 25 and 26 drive the upper and the lower supporting members to pinch the beam 3 between the rollers 23 and 24. Thereupon, the rollers 24 are driven to extract the beam 3 towards the right in FIG. 2. The extracted beam 3 is further driven by the rollers 23 and 24 until it is transferred onto the receiving member 32.

On the other hand, the electrode 1 from which the beam 3 has been extracted is now free from support on the conveyor 5, only being supported by the power cylinders 10 and 12 and supporting roller 19. When a command is issued upon the completion of a beam extracting operation, the power cylinder 18 is actuated again, gradually withdrawing the supporting arm 16 from the position shown in solid lines in FIG. 1 in the opposite direction to the arrow A, towards the position shown in dotted lines, and simultaneously, the seats 11 and 13 attached to the power cylinders 10 and 12 supporting the electrode 1 are gradually withdrawn, with the result that the electrode 1 is brought towards the receiving base 20 and finally dropped along the guide plate 21. Now, the stacking operation of an electrode plate 1 is over.

On the other hand, when the limit switch LS1 detects the arrival of a beam 3 on the receiving member 32, the transporting conveyor 30 disposed underneath it is lifted upward by the actuation of the cylinder 31 so that its chains 34 are lifted through the apertures 33 and 33 in the receiving member 32 above it, with the result that the beam 3 now spans the two chains 34 and 34 and is conveyed by them towards the conveyor 37. Before leaving the conveyor 30, the beam 3 trips the limit switch LS2 thereby sending the conveyor 30 back to the lower position shown in FIG. 3 in dotted lines.

The beam 3 that has just been transferred onto the conveyor 37 is put in front of the hooks 39 on said conveyor 37, and as soon as the limit switch LS3 is tripped, the conveyor 37 is set in motion, only to be stopped again automatically after travelling a distance equal to the interval between the hooks 39.

The beams which are sent forward maintaining contact with the hooks 39 on the conveyor 37 in this way are transferred from the conveyor 37 onto the hooks 42 on the conveyor 40 at the intersection between the conveyors 37 and 40. This takes place when the beam 3 trips the limit switch LS4, the pusher 43 is actuated to push the beam 3 onto the predetermined position on the conveyor 40, whereupon the conveyor 40 is driven through a distance equal to the interval of the hooks 42 before being stopped again.

During the movement of the conveyor 40, the beams 3 trip a counter switch provided in the path of movement of beams 3, thereby when the count reaches a predetermined number, the magnet 46 of the truck 45 is energized and simultaneously lowered and then is lifted again after picking up the plurality of beams 3 aligned on the conveyor 40 by magnetic attraction. Thereupon, the truck 45 moves towards the container 47 of the rails 44 until it is stopped by tripping the limit switch LS5. Thereupon, the magnet 46 is deenergized to drop the beams 3 into the container 47, and then the truck 45 is driven backward until it trips the limit switch LS6 so as to be stopped.

Although in the foregoing description of an embodiment, only electrodes are assumed as the handling object, the present invention is by no means limited to electrodes, and it should be understood clearly that the present invention is just as well adaptable to other plate-formed or bar-formed objects.

What is claimed is:

1. A method of arranging sheet-like objects having annular suspension elements attached to the upper ends of said objects, and support beams removably extending through said suspension elements of said objects, which comprises the steps of: supporting said beams in spaced-apart relation on movable conveyor means so that said objects are suspended by said beams in an upright, downwardly hanging, spaced-apart relationship on said conveyor means; conveying said beams having said objects suspended thereon toward a discharge station and, as said objects approach said discharge station, gradually raising the lower ends of said objects while said beams remain supported on said conveying means so that said objects become inclined with respect to the vertical; stopping said conveying means when an object reaches said discharge station, while maintaining the object thereat in said inclined position; moving supporting means into supporting engagement with said object at said discharge station to support same thereat independently of said beam; removing said beam from said suspension elements while said object is supported by said supporting means; and then removing said supporting means and permitting said object to drop downwardly in a substantially horizontal orientation so that the objects are stacked in succession one on top of another.

2. A method according to claim 1, in which said conveying means includes first and second conveyors arranged in series, wherein said conveying step comprises: intermittently moving said first conveyor having said beams supported thereon to advance said objects toward said second conveyor, transferring said beams and said objects from said frist conveyor to said second conveyor, moving said second conveyor at a speed faster than that of said first conveyor, the lower ends of said objects being gradually raised as they are moved by said second conveyor toward said discharge station.

3. A method according to claim 2 wherein said supporting means comprises first and second independent supporting means adjacent the leading and trailing ends, respectively, of an object at said discharge station, and including the steps of moving said first supporting means into supporting contact with the underside of said object at said discharge station adjacent the leading end thereof and simultaneously positioning said second supporting means in supporting engagement with the trailing end thereof, and after said beam has been removed, withdrawing said first and second supporting means from supporting engagement with said object.

4. An apparatus for arranging sheet-like objects suspended on beams, comprising: conveying means for conveying said objects to a discharge station, said conveying means comprising spaced-apart conveying elements having means thereon for engaging and moving the lateral ends of beams so that said objects suspended on said beams hang downwardly between said conveying elements in a substantially vertical, spaced-apart orientation; inclined guide means disposed ahead of said discharge station and located below said conveying elements for engaging the lower portions of said objects and moving said objects into an inclined position with respect to the vertical as they approach said discharge station; a stopping device at said discharge station for stopping movement of said conveying means; movable seat means located adjacent the leading end of said guide means and removably engageable with the lower portion of an object at said discharge station; a movable support arm engageable with the underside of said object at said discharge station adjacent the uppermost part of said object whereby said object is supported by said seat means and said support arm when it is at said discharge station; means at said discharge station for removing said beam from the object thereat; and means for moving said seat means and said supporting arm out of supporting engagement with said object to permit said object to drop downwardly in a substantially horizontal orientation so that successively presented objects are stacked one on top of the other.

5. An apparatus according to claim 4 in which said seat means has fluid pressure cylinder means connected thereto for moving said seat means into and out of supporting engagment with an object at said discharge station.

6. An apparatus according to claim 5 in which said support arm is mounted for pivotal movement about a horizontal axis located in front of said discharge station and including power operated means for moving said arm forwardly and rearwardly into and out of a position underlying the upper portion of said object at said discharge station.

7. An apparatus according to claim 4 wherein said guide means is an inclined plate slidably engageable with the lower portion of the objects as they are advanced to the discharge station.

8. An apparatus according to claim 4 in which said conveying means comprises first and second conveyors arranged in series, means for transferring said objects from said first conveyor to said second conveyor, means for moving said second conveyor at a speed faster than that of said first conveyor, said guide means, said seat means and said support arm being associated in cooperative relationship with said second conveyor, said second conveyor having hooks thereon for engaging said beams and preventing movement of said beams off said conveyor.

* * * * *